United States Patent
Pang et al.

(10) Patent No.: US 9,207,085 B2
(45) Date of Patent: Dec. 8, 2015

(54) NAVIGATION SYSTEM AND METHOD FOR DIFFERENT MOBILITY MODES

(75) Inventors: Eric HC Pang, Jiangsu (CN); Stefano Villanti, Jiangsu (CN)

(73) Assignee: QOROS AUTOMOTIVE CO., LTD. (CN)

( * ) Notice: Subject to any disclaimer, the term of this patent is extended or adjusted under 35 U.S.C. 154(b) by 0 days.

(21) Appl. No.: 14/385,498

(22) PCT Filed: Mar. 16, 2012

(86) PCT No.: PCT/CN2012/072465
§ 371 (c)(1), (2), (4) Date: Sep. 15, 2014

(87) PCT Pub. No.: WO2013/134956
PCT Pub. Date: Sep. 19, 2013

(65) Prior Publication Data
US 2015/0081218 A1    Mar. 19, 2015

(51) Int. Cl.
*G01C 21/00* (2006.01)
*G01C 21/20* (2006.01)

(52) U.S. Cl.
CPC ............... *G01C 21/00* (2013.01); *G01C 21/20* (2013.01)

(58) Field of Classification Search
None
See application file for complete search history.

(56) References Cited

U.S. PATENT DOCUMENTS

| | | | | |
|---|---|---|---|---|
| 6,339,746 B1* | 1/2002 | Sugiyama | ............... | G08G 1/005 340/323 R |
| 6,510,379 B1* | 1/2003 | Hasegawa | ............... | G01C 21/20 340/988 |
| 6,542,811 B2* | 4/2003 | Doi | ............... | G01C 21/20 701/429 |
| 6,636,145 B1* | 10/2003 | Murakami | ............... | G07B 15/00 340/5.42 |
| 9,103,681 B2* | 8/2015 | McGavran | ............... | G01C 21/00 |
| 2001/0020211 A1* | 9/2001 | Takayama | ............... | G06F 9/45512 701/410 |
| 2003/0093216 A1* | 5/2003 | Akiyama | ............... | G01C 21/3697 701/433 |
| 2006/0190168 A1* | 8/2006 | Ohnishi | ............... | G01C 21/3629 701/433 |
| 2008/0033644 A1* | 2/2008 | Bannon | ............... | G01C 21/3461 701/414 |
| 2008/0147313 A1* | 6/2008 | Nesbitt | ............... | G01C 21/367 701/426 |
| 2008/0167806 A1* | 7/2008 | Wheeler | ............... | G01S 5/0027 701/532 |
| 2008/0208447 A1* | 8/2008 | Geelen | ............... | G01C 21/34 701/533 |
| 2008/0312819 A1* | 12/2008 | Banerjee | ............... | G01C 21/20 701/433 |
| 2009/0157583 A1* | 6/2009 | Couckuyt | ............... | G06Q 30/02 706/46 |
| 2010/0036610 A1* | 2/2010 | Urciuoli | ............... | G06Q 10/00 701/469 |
| 2011/0178703 A1* | 7/2011 | Aben | ............... | G01C 21/3679 701/408 |
| 2011/0275358 A1* | 11/2011 | Faenger | ............... | H04W 8/24 455/420 |

* cited by examiner

*Primary Examiner* — Jonathan M Dager

(57) ABSTRACT

A system and method enable calculation of navigation data as a function of mobility mode and to transmit the calculated data to devices accordingly. The system and method calculate first navigation data based on a first mobility mode at a first device; receive a mobility mode change indication to a second mobility mode; calculate second navigation data based on the second mobility mode; and then transmit the second navigation data to a second device. The calculations can be done at the first device (e.g., a navigation system installed in a vehicle), the second device (e.g., a mobile device), and/or at a third device (e.g., server).

18 Claims, 3 Drawing Sheets

NAVIGATION SYSTEM AND METHOD FOR DIFFERENT MOBILITY MODES

FIELD OF THE INVENTION

At least one embodiment pertains to navigation, and more particularly, to a system and method for providing seamless navigation across various devices as a function of mobility mode.

BACKGROUND

Conventional navigations systems provide navigation solutions based on a single mobility mode and not for transitions between mobility modes. For example, a conventional navigation system may provide directions for driving a car and not for walking or not for driving partially and walking partially. Directions for walking could vary significantly from driving since different routes may be available that are unavailable for cars. For example, a walker can walk on paths or against vehicular traffic on a sidewalk adjacent a one-way street.

Accordingly, a new system and method may be needed to provide navigation across multiple mobility modes.

SUMMARY

An embodiment includes a system and method to enable calculation of navigation data as a function of mobility mode and to transmit the calculated data to devices accordingly. Accordingly, the system and method help a person get to their final desired location. In an embodiment, the method calculates first navigation data based on a first mobility mode at a first device; receives a mobility mode change indication to a second mobility mode; calculates second navigation data based on the second mobility mode; and then transmits the second navigation data to a second device. The first navigation data calculation can be performed between the first device and a server. The second navigation data can be derived directly from the server.

In an embodiment, the system comprises mode change indication logic, direction logic and transmission logic. The mode logic receives a mobility mode change indication from a first mobility mode to a second mobility mode. The direction logic calculates first navigation data based on the first mobility mode and second navigation data based on the second mobility mode. The transmission logic transmits the second navigation data to a second device.

In an embodiment, the calculations can be done at the first device (e.g., a navigation system installed in a vehicle), the second device (e.g., a mobile device), and/or at a third device (e.g., server). The navigation data can include directions, a destination, and/or an origination. The first navigation data may include driving directions while the second navigation data may include walking directions. The first device can be installed in a vehicle while the second device may be a mobile device (e.g., mobile phone). The mobility mode change indication can include an indication that the vehicle has been placed in Park and/or that the first device has been powered off (e.g., no further signals are received from the first device).

BRIEF DESCRIPTION OF THE DRAWINGS

One or more embodiments are illustrated by way of example and not limitation in the figures of the accompanying drawings, in which like references indicate similar elements.

DETAILED DESCRIPTION

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, such references are not necessarily mutually exclusive either.

Figure 1:
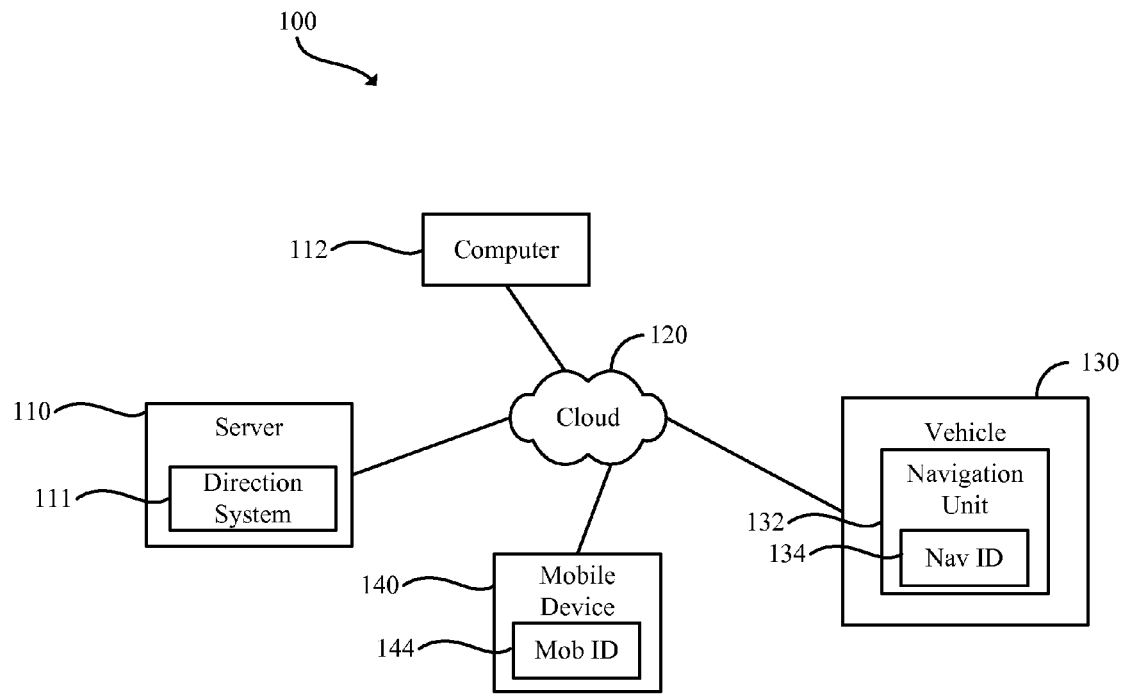
FIG. 1 is a diagram illustrating a network according to an embodiment.

FIG. 1 is a diagram illustrating a network 100 according to an embodiment. The network 100 includes a server 110, a computer 112, a network (cloud) 120, a vehicle (e.g., automobile) 130, and a mobile device 140. The server 110 includes a direction system 111 configured to receive origination and destination data, as well as network 100 node identifiers, and transmit navigation information to the navigation unit 132 and/or the mobile device 140. In an embodiment, the direction system 111 resides instead of or in addition on the navigation unit 132 and/or the mobile device 140. The vehicle 130 includes a navigation unit 132 that is coupled the vehicle 130 (e.g., installed in or detachably coupled to the vehicle 130). In other embodiments, the vehicle 130 can include other vehicles, such as aircraft, ships, motorcycles, submersibles, etc. The navigation unit 132 includes a nav ID 134, such as a MAC address and/or other identifier. The mobile device 140, which can include a laptop, mobile phone, etc., includes a mob ID 144, such as a MAC address and/or other identifier. Note that the network 100 can include other and/or additional nodes.

The cloud 120 can be, for example, a local area network (LAN), wide area network (WAN), metropolitan area network (MAN), global area network such as the Internet, a Fibre Channel fabric, or any combination of such interconnects. Each of the server 110, the computer 112, and the navigation unit 132 may be, for example, a conventional personal computer (PC), server-class computer, workstation, handheld computing/communication device, or the like.

During operation of the network 100, the direction system 111 receives an origination, destination and identifiers (134 and 144) from one of the other nodes on the network 100. For example, a user can enter the data on the computer 112, which then transmits the data to the direction system 111 via the cloud 120. The direction system 111 then calculates navigation data based on mobility mode (e.g., driving directions for the navigation unit 132 to the closest point available for the destination and walking directions from the closest point to the actual destination or just the actual origins and destinations and directions are calculated by the receiving units 132 and 140) and transmits the data to the navigation unit 132 and mobile device 140, respectively. The navigation device 132 and mobile device 140 can then output (visually, aurally, etc.) their respective received data and/or calculated data (e.g., directions) to the user.

In another embodiment, the direction system 111 calculates navigation data in real-time when receiving a mode change indication and new origination from the navigation unit 132 and/or the mobile device 140. For example, a user may have parked his/her vehicle 130, triggering the navigation unit 132 to determine position using a positioning system (e.g., GPS, Beidou, Glonass, Galileo, Loran, etc.) and transmitting a mobility mode change indication and the position as a new origination to the direction system 111. The direction system 111 then calculates navigation information based on the new mobility mode and new origination and transmits the newly calculated navigation data to the mobile device 140, the vehicle 130 and/or the navigation unit 132, which then outputs (visually, aurally, etc.) it to the user.

Figure 2:
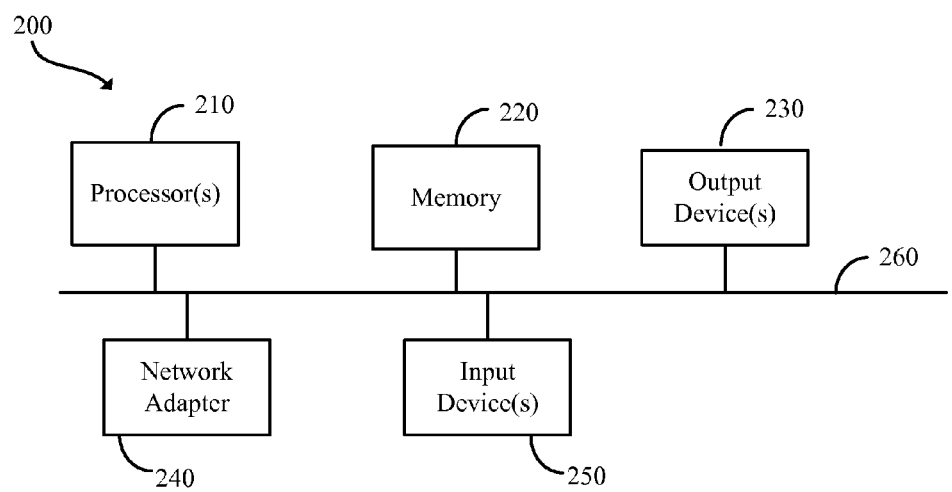
FIG. 2 is a high-level extent diagram showing an example of architecture of a client, server and/or navigation unit of FIG. 1.

FIG. 2 is a high-level extent diagram showing an example of an architecture 200 of the server 110, the computer 112, the navigation unit 132 or mobile device 140 of FIG. 1. The architecture 200 includes one or more processors 210 and memory 220 coupled to an interconnect 260. The interconnect 260 shown in FIG. 2 is an abstraction that represents any one or more separate physical buses, point-to-point connections, or both, connected by appropriate bridges, adapters, or controllers. The interconnect 260, therefore, may include, for example, a system bus, a form of Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire", and/or any other suitable form of physical connection.

The processor(s) 210 is/are the central processing unit (CPU) of the architecture 200 and, thus, control the overall operation of the architecture 200. In certain embodiments, the processor(s) 210 accomplish this by executing software or firmware stored in memory 220. The processor(s) 210 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 220 is or includes the main memory of the architecture 200. The memory 220 represents any form of random access memory (RAM), read-only memory (ROM), flash memory, or the like, or a combination of such devices. In use, the memory 220 may contain, among other things, software or firmware code for use in implementing at least some of the embodiments of the invention introduced herein.

Also connected to the processor(s) 210 through the interconnect 260 is a communications interface 240, such as, but not limited to, a network adapter, one or more output device(s) 230 and one or more input device(s) 250. The network adapter 240 provides the architecture 200 with the ability to communicate with remote devices over the network cloud 120 and may be, for example, an Ethernet adapter or Fibre Channel adapter. The input device 250 may include a touch screen, keyboard, and/or mouse, etc. The output device 230 may include a screen and/or speakers, etc. In an embodiment, the architecture 200 includes a receiving device (e.g., antenna) to receive satellite or other signals needed to calculate location.

The techniques introduced herein can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, means: a) special-purpose hardwired circuitry, such as one or more application-specific integrated circuits (ASICs), programmable logic devices (PLDs), field programmable gate arrays (FPGAs), or other similar device(s); b) programmable circuitry programmed with software and/or firmware, such as one or more programmed general-purpose microprocessors, digital signal processors (DSPs) and/or microcontrollers, or other similar device(s); or c) a combination of the forms mentioned in a) and b).

Note that any and all of the embodiments described above can be combined with each other, except to the extent that it may be stated otherwise above or to the extent that any such embodiments might be mutually exclusive in function and/or structure.

Figure 3:
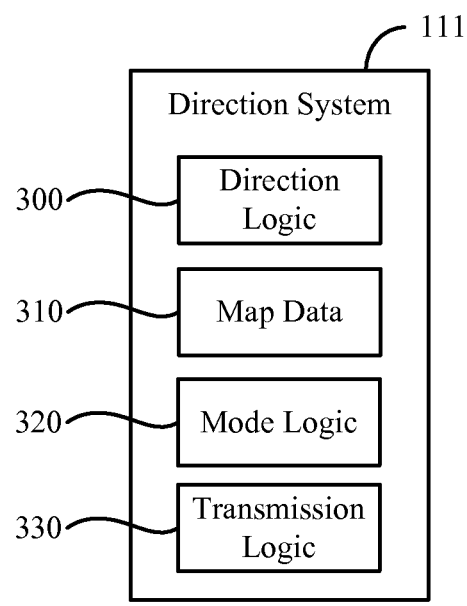
FIG. 3 is a block diagram showing contents of the direction system of FIG. 1.

FIG. 3 is a block diagram showing contents of the direction system 111 of FIG. 1. The direction system 111 includes direction logic 300, map data 310, mode logic 320 and transmission logic 330. The direction system 111 is configured to receive, with the transmission logic 330, an origination, a destination and IDs 134 and 144 of network 100 nodes. The IDs 134 and 144 are associated with a mobility mode (walking, driving, etc.) indicated in a database (not shown) in the direction system 111 and/or by the IDs themselves. The direction system 111 is configured to then calculate navigation data, using the map data 310 if required, and transmit the calculated navigation data, with the transmission logic 330, to the nodes associated with the IDs as a function of mobility mode.

The calculated navigation data may include driving directions for the navigation unit 132 or the vehicle 130 and walking directions (from the terminus of the driving directions to the actual destination) for the mobile device 140. Alternatively, the navigation data may only include the origination, destination and driving directions terminus and the devices 132 and 140 can then calculate directions as needed. In an embodiment, the navigation data only includes the destination and origination and driving directions terminus are calculated in real-time by the devices 132 and 140.

While the vehicle 130 is parked in a current point (CP) before the destination point (DP), the navigation unit 132 is configured to send notification to central server 110 that the distance between the current point (CP) and the destination point (DP) is less than a predetermined value, e.g. 3 KM, preferably 1 KM, and more preferably 0.5 KM.

The direction logic 300 then sends the walking directions from the current point (CP) to the destination point (DP). In a first embodiment, the mobile device 140 receives a short text message which contains the directions from the current point CP to the destination point DP. In a second embodiment, the mobile device 140 receives a multimedia message containing acoustic directions. The user can reach the destination following the acoustic directions. In a third embodiment, the direction logic 300 will send the navigation data of directions from the current point (CP) to the destination point (DP) to the user's mobile device 140 if the mobile device 140 has the same navigation software as a navigation software in the vehicle 130. Additionally, the user may get a short text message to choose whether to receive the walking direction data, instead of receiving the walking direction data directly.

The map data 310 includes street, path, sidewalk, or other data needed for calculating directions. The mode logic 320 is configured to determine or receive an indication of a change of mobility mode so that the direction logic 300 can send the appropriate data to the appropriate network 100 node. For example, the mode logic 320 may be configured to receive an indication of a switch from the navigation unit 132 (driving) to mobile device 140 (walking) by the navigation unit 132 being powered off; the vehicle 130 being placed in park; the vehicle 130 reaching the determined driving directions terminus; a user transmitting an indication of the switch; an engine is off; a key is removed from an ignition; and/or a door is opened; etc. The transmission logic 330 is configured to work with the other logics 300 and 320 to receive and transmit data to other network 100 nodes via the cloud 120.

Figure 4:
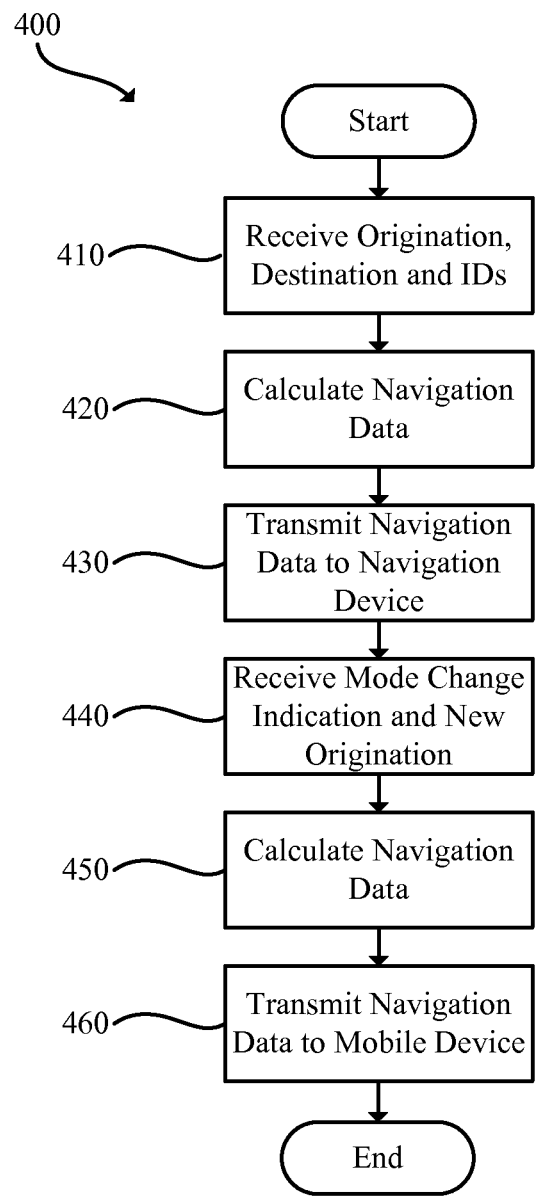
FIG. 4 is a flowchart illustrating a navigation technique.

FIG. 4 is a flowchart illustrating a navigation technique 400. In an embodiment, in operation, the direction logic 300 receives (410), with the transmission logic 330, from the computer 112 or other network 100 node, an origination, a destination and IDs 134 and 144. The direction logic 300 then calculates (420) navigation data based on mobility mode and transmits (430), with the transmission logic 330, the navigation data to the navigation unit 132 and/or the mobile device 140. The transmission (430) can start at vehicle 130 ignition or in advance (e.g., after the receiving (410)).

The navigation unit 132 starts to detect the driving condition (e.g., location) while the navigation is started. In one embodiment, the navigation unit 132 will start to navigate automatically when the user starts the vehicle 130. In another embodiment, the navigation unit 132 will inquire the user whether wants to navigate with the preselected route and destination e.g., by providing a digital option button on the screen of the navigation unit 16 or an acoustic inquiry. The navigation unit 132 determines the driving condition by receiving data from sensors in the different parts of the vehicle 130.

In another embodiment, if the vehicle 130 is parked in the current point (CP) before the destination point (DP), the navigation unit 132 will continue navigating the route from the current point (CP) to the destination point (DP) automatically while the vehicle 130 is restarted. Alternatively, the navigation unit 132 is further configured to inquire whether the user wants to navigate the remaining route from the current point (CP) to the destination point (DP) by providing a digital option button on the screen or an acoustic inquiry.

The mode logic 320 then optionally receives (440) or determines a mobility mode change and optionally a new origination. The direction logic 300 then calculates (450) navigation data based on the changed mobility mode and transmits (460) the same to the mobile device 140. The method 400 then ends. In an embodiment, parts of the technique 400 can be carried out in a different order or substantially simultaneously. For example, navigation data as a function of mobility mode can be calculated together and transmitted at approximately similar times to the navigation unit 132 and the mobile device 140. Further, directions can be calculated and transmitted by the direction logic 300 and/or by the devices 132 and/or 140 themselves.

Although embodiments have been described with reference to specific exemplary embodiments, it will be recognized that embodiments are not limited to the particular embodiments described, but can be practiced with modification and alteration within the spirit and scope of the appended claims. Accordingly, the specification and drawings are to be regarded in an illustrative sense rather than a restrictive sense.

What is claimed is:

1. A method, comprising:
calculating first navigation data based on a first mobility mode at a first device in response to a server;
transmitting a mobility mode change indication indicating a second mobility mode to the server; and
receiving second navigation data based on the second mobility mode to at a second device;
wherein the second navigation data is derived directly from the server, and the transmitting the mobility mode change indication includes transmitting the mobility mode change indication in response to an indication that a distance between a current position of the first device and a destination position is less than or equal to a predetermined distance.

2. The method of claim 1, wherein:
the first navigation data includes driving directions; and
the first device is disposed in a vehicle.

3. The method of claim 2, wherein:
the second navigation data includes walking directions; and
receiving the second navigation data comprises a text message.

4. The method of claim 3, wherein the walking directions originate from a terminus of the driving directions.

5. The method of claim 3, wherein the walking directions originate at a position of the second device.

6. The method of claim 1, wherein the transmitting the mobility mode change indication includes transmitting the mobility mode change indication in response to an indication that a vehicle has been placed in park.

7. A system, comprising:
mode logic configured to receive a mobility mode change indication indicating a change from a first mobility mode to a second mobility mode from at least one of a first device and a second device;
direction logic configured to calculate first navigation data based on the first mobility mode and to calculate second navigation data based on the second mobility mode; and
transmission logic configured to transmit the second navigation data to the second device,
wherein the mobility mode change indication includes an indication that a distance between a current position of the first device and a destination position is less than or equal to a predetermined distance.

8. The system of claim 7, wherein:
the first navigation data includes driving directions;
the transmission logic is further configured to transmit the first navigation data to the first device; and
the first device is disposed in a vehicle.

9. The system of claim 8, wherein:
the second navigation data includes walking directions; and
the transmission logic is configured to transmit the second navigation data via text message.

10. The system of claim 9, wherein the walking directions originate from a terminus of the driving directions.

11. The system of claim 9, wherein the walking directions originate at a position of the second device.

12. The system of claim 7, wherein the mobility mode change indication includes an indication that a vehicle has been placed in park.

13. A method to perform navigation among a server, a navigation unit of a vehicle, and a mobile device, comprising:

calculating first navigation data based on a first mobility mode at the navigation unit of the vehicle by a direction system in the server;

transmitting the calculated first navigation data to the navigation unit of the vehicle;

receiving a mobility mode change indication indicating a change to a second mobility mode at the server;

calculating second navigation data based on the second mobility mode at the server; and transmitting the second navigation data to the mobile device by the server;

wherein the first navigation data includes driving directions, and the second navigation data includes walking directions, and wherein receiving the mobility mode change indication includes receiving an indication that a distance between a current position of the navigation unit of the vehicle and a destination position is less than or equal to a predetermined distance.

14. The method of claim 13, further comprising receiving data including an origination, destination and device identifiers at the direction system.

15. The method of claim 14, further comprising receiving the data at the direction system via a network from a personal computer or mobile device of a user that is connected to the network.

16. The method of claim 14, further comprising receiving the data at the direction system via a network from the navigation unit of the vehicle.

17. The method of claim 13, wherein the walking directions originate at a current position of the navigation unit of the vehicle.

18. The method of claim 13, wherein the walking directions originate at a position of the mobile device.

* * * * *